United States Patent [19]

Takefman

[11] Patent Number: 5,761,197
[45] Date of Patent: Jun. 2, 1998

[54] COMMUNICATIONS IN A DISTRIBUTION NETWORK

[75] Inventor: Michael Lewis Takefman, Nepean, Canada

[73] Assignee: Northern Telecom Limited, Montreal, Canada

[21] Appl. No.: 338,850

[22] Filed: Nov. 14, 1994

[51] Int. Cl.⁶ .................. H04J 3/06; H04B 7/212
[52] U.S. Cl. .................. 370/337; 370/395; 370/443; 370/458; 370/510
[58] Field of Search .................. 370/321, 329, 370/336, 337, 347, 422, 443, 458, 503, 510, 395; 455/450, 451, 502, 509, 3.1, 4.1, 4.2; 348/6, 7, 385, 387; 359/135, 136, 140, 167, 118; 340/825.08, 825.14, 825.2

[56] References Cited

U.S. PATENT DOCUMENTS

| | | | |
|---|---|---|---|
| 4,742,512 | 5/1988 | Akashi et al. | 370/95.3 |
| 4,949,395 | 8/1990 | Rydbeck | 455/33 |
| 5,008,883 | 4/1991 | Eizenhofer et al. | 370/95.1 |
| 5,103,445 | 4/1992 | Ostlund | 370/79 |
| 5,150,247 | 9/1992 | Sharpe et al. | 359/135 |
| 5,166,675 | 11/1992 | Amemiya et al. | 340/825.08 |
| 5,239,543 | 8/1993 | Janssens | 370/105.1 |
| 5,303,234 | 4/1994 | Kou | 370/95.3 |
| 5,307,349 | 4/1994 | Shloss et al. | 370/85.2 |
| 5,315,584 | 5/1994 | Savary et al. | 370/18 |
| 5,343,240 | 8/1994 | Yu | 348/14 |
| 5,355,368 | 10/1994 | Dore et al. | 370/105.1 |
| 5,384,777 | 1/1995 | Ahmadi et al. | 370/85.2 |
| 5,398,129 | 3/1995 | Reimann | 359/137 |
| 5,425,027 | 6/1995 | Baran | 370/69.1 |
| 5,444,710 | 8/1995 | Fisher et al. | 370/95.3 |
| 5,499,047 | 3/1996 | Terry et al. | 348/6 |

FOREIGN PATENT DOCUMENTS

42 33 581   4/1994   Germany.

Primary Examiner—Chi H. Pham
Assistant Examiner—Ricky Ngo
Attorney, Agent, or Firm—R. John Haley

[57] ABSTRACT

A central station of a cable television distribution network transmits TDM frames comprising distribution information and overhead information downstream to customer terminals, and determines corresponding upstream TDMA frames by including an upstream frame identity in the overhead information of each downstream frame. Each terminal buffers asynchronous information for upstream transmission, and stores an upstream frame identity which it is assigned. On detecting this frame identity in the downstream overhead information, the terminal transmit a buffer queue size in an assigned time slot of the corresponding upstream frame. The central station uses the queue sizes from the terminals to allocate time slots in the upstream frames to terminals, by including their terminal addresses in the downstream overhead information, for transmission of the buffered asynchronous information. The central station can also assign time slots to the terminals for transmission of isochronous information.

21 Claims, 5 Drawing Sheets

COMMUNICATIONS IN A DISTRIBUTION NETWORK

This invention relates to communications in a distribution network, and more particularly to bidirectional communications in a distribution network in which a central or distribution station communicates with a plurality of terminals. An example of such a network to which this invention is particularly applicable is a cable network via which television signals are distributed to television terminals, and via which other signals, for example data, voice, and control signals, can be communicated in both directions between terminals and the central station.

BACKGROUND OF THE INVENTION

Cable television distribution networks are well known. In such networks, analog television signals are carried to customer terminals (television receivers) from a central station or head end via a branched coaxial cable which includes bridger amplifiers, line extenders, and customer taps. Each television signal occupies a 6 MHz channel at a frequency from about 50 MHz to about 450 MHz or more. The upper frequency is limited by the bandwidth of the bridger amplifiers and line extenders and the attenuation of the coaxial cable, which as is well known increases with increasing frequency.

Various ways have been proposed for communicating additional signals via a cable television distribution network, typically involving the supply of such signals via optical fibers to appropriate points in the coaxial cable system with delivery of the signals to the customer premises via the coaxial cable, referred to as the drop cable, which already exists from the customer tap to the customer premises. It is desired also to accommodate signals in the upstream direction from the customer premises to the central station, so that the network can then serve for communicating arbitrary types of signals in both directions; such signals can include for example television program selection and control signals, metering signals, voice signals, and data signals.

In the downstream direction from the central station to the terminals, the cable distribution network constitutes a point-to-multipoint network, on which signal transmission is relatively easy to provide. In the upstream direction from the terminals to the central station, this network is a multipoint-to-point network, on which signal transmission is much more difficult to provide.

One reason for the difficulty is the problem of contention among different terminals simultaneously wishing to transmit signals to the central station. Various collision detection schemes have been proposed generally for multipoint-to-point communications networks; these are not particularly suited to the cable distribution network, especially in view of the large number of terminals which may exist in such a network. Contention among the terminals may be avoided by polling each terminal in turn; however, this results in an undesired loss of downstream bandwidth for polling signals from the central station, variable delays for responses from different terminals due to their varying distances from the central station, and long intervals between successive polls of each station due to these delays and the large number of terminals.

In addition, there can be a wide variation in the bandwidth which is required by each terminal, at any particular time, for transmitting signals in the upstream direction. For example, these signals can be isochronous (constant bit rate) signals, such as voice, metering, and video signals, and/or asynchronous (variable bit rate) signals, such as computer data signals, keyboard operations, and television push-button control signals. Providing for efficient transmission of these different types of signals from a large number of terminals is difficult.

Furthermore, it is always a consideration to provide the equipment needed in each terminal in a relatively small size and at a relatively low cost.

Accordingly, an object of this invention is to provide an improved method of communicating information between a central station and a plurality of terminals of a distribution network.

SUMMARY OF THE INVENTION

This invention broadly provides a method of communicating information in TDM (time division multiplex) frames in a downstream direction from a central station of a distribution network to a plurality of terminals of the network and in TDMA (time division multiple access) frames in an upstream direction from the plurality of terminals to the central station, each terminal having a respective terminal identity, comprising the steps of: transmitting in the downstream frames distribution information and overhead information, the overhead information comprising synchronization information for synchronizing the plurality of terminals to the upstream frames and authorization information for authorizing selected terminals each to transmit in an upstream frame; and in each terminal, transmitting information in a respective time slot in an upstream frame in response to the authorization information and information stored in the terminal.

The authorization information in the downstream frames can comprise a frame identity for each upstream frame, the information stored in each terminal comprising an identity of an upstream frame and information identifying a time slot in that frame for transmission of information by the terminal. This is particularly convenient for upstream transmission of polling information and isochronous information from the terminals. For providing different rates of transmission of isochronous information, preferably the information stored in each terminal further comprises a masking field for masking part of a comparison in the terminal of its stored upstream frame identity with each frame identity in the authorization information.

Alternatively, or preferably in addition, the authorization information in the downstream frames can comprise the terminal identity of each terminal authorized to transmit in an upstream frame and an indication identifying a time slot in the upstream frame in which each terminal is authorized to transmit, and the information stored in each terminal comprises the respective terminal identity. This is particularly convenient for upstream transmission of asynchronous information from the terminals. The indication identifying a time slot in the upstream frame in which each terminal is authorized to transmit is conveniently constituted by a relative position of the terminal identity in the downstream frame.

Another aspect of this invention provides a method of communicating information between a central station and a plurality of terminals in a distribution network, comprising the steps of: at the central station, determining downstream TDM frames, for transmission of distribution information and overhead information from the central station to the plurality of terminals, and upstream TDMA frames, for transmission of information in respective time slots from the terminals to the central station, each upstream frame having a frame identity which is included in the overhead information of a corresponding downstream frame; in each terminal, buffering asynchronous information for transmission upstream, storing an upstream frame identity and a time slot identity assigned to the terminal, monitoring the overhead information in the downstream frames for the stored upstream frame identity, and, in response to detection of the stored upstream frame identity in the overhead information in a downstream frame, transmitting, in the assigned time slot of the corresponding upstream frame, information comprising an indication of a queue size of the buffered asynchronous information; at the central station, allocating time slots in the upstream frames to terminals in accordance with the queue size indications from the terminals, and including in the overhead information in the corresponding downstream frames an indication of each terminal which is allocated such a time slot and the time slot which it is allocated; and in each terminal having buffered asynchronous information, monitoring the overhead information in the downstream frames for the indication of the terminal and, in response to detection of the indication of the terminal in the overhead information in a downstream frame, transmitting buffered asynchronous information in the allocated time slot of the corresponding upstream frame.

Preferably the downstream and upstream frames have the same frame period, and the method further comprises the step of including synchronization information in the overhead information in the downstream frames for synchronizing the terminals to the upstream frames. The method advantageously further comprises the step of storing in each terminal a marshalling delay, inversely dependent on a distance of the terminal from the central station, for delaying timing of upstream frames at the terminal.

The time slots in the upstream frames allocated for the transmission of the buffered asynchronous information are preferably larger than the time slots assigned to the terminals for the transmission of information comprising the indication of a queue size of the buffered asynchronous information. Conveniently m time slots in the upstream frames allocated for the transmission of the buffered asynchronous information have the same size as n time slots assigned to the terminals for the transmission of information comprising the indication of a queue size of the buffered asynchronous information, where m and n are integers and n>m. For example m may be equal to one.

The method can further comprise the step of transmitting, from at least one of the terminals, isochronous information from the terminal as part of the information comprising an indication of a queue size of the buffered asynchronous information in the assigned time slot of the respective upstream frame. Thus isochronous information from a terminal can be appended to polling information from the terminal in the same time slot.

Alternatively, or in addition, the method can further comprise the steps of, in at least one terminal having isochronous information to be transmitted upstream, storing an upstream frame identity and a time slot identity assigned to the terminal by the central station for transmission of the isochronous information, monitoring the overhead information in the downstream frames for this stored upstream frame identity, and, in response to detection of this stored upstream frame identity in the overhead information in a downstream frame, transmitting the isochronous information in the assigned time slot of the corresponding upstream frame. Thus isochronous information from a terminal can be assigned time slots separate from polling information from the terminal.

The method preferably further comprises storing in said at least one terminal a masking field for masking part of a detection in the terminal of the stored upstream frame identity for transmission of the isochronous information in the overhead information in the downstream frames. The use of a masking field facilitates providing different isochronous information rates to different terminals.

According to another aspect, this invention provides a method of allocating upstream transmission capacities to terminals in a distribution network in which distribution information and overhead information are transmitted in TDM frames in a downstream direction from a central station to the terminals, comprising the steps of: providing, for transmission from the terminals to the central station, upstream TDMA frames in which there are at least two different sizes of time slots, and identifying each upstream frame by a frame identity in the overhead information in a corresponding downstream frame so that the terminals can determine the time slots for each upstream frame; assigning time slots of a first size to at least some of the terminals for transmitting upstream queue size information for buffered asynchronous information to be transmitted upstream from the terminal, each such terminal storing an identity of an assigned time slot and an upstream frame identity for transmitting the queue size information, monitoring the overhead information in the downstream frames to detect the assigned frame identity, and transmitting the queue size information in the assigned time slot in the corresponding upstream frame; and allocating time slots of a second size to terminals in dependence upon the queue size information by transmitting from the central station in the overhead information in the downstream frames an indication of each terminal which is allocated such a time slot and the time slot which it is allocated, each terminal having buffered asynchronous information to be transmitted monitoring the overhead information in the downstream frames to detect the indication of the terminal and transmitting buffered asynchronous information in the allocated time slot of the corresponding upstream frame.

BRIEF DESCRIPTION OF THE DRAWINGS

The invention will be further understood from the following description with reference to the accompanying drawings, in which.

DETAILED DESCRIPTION

Figure 1:
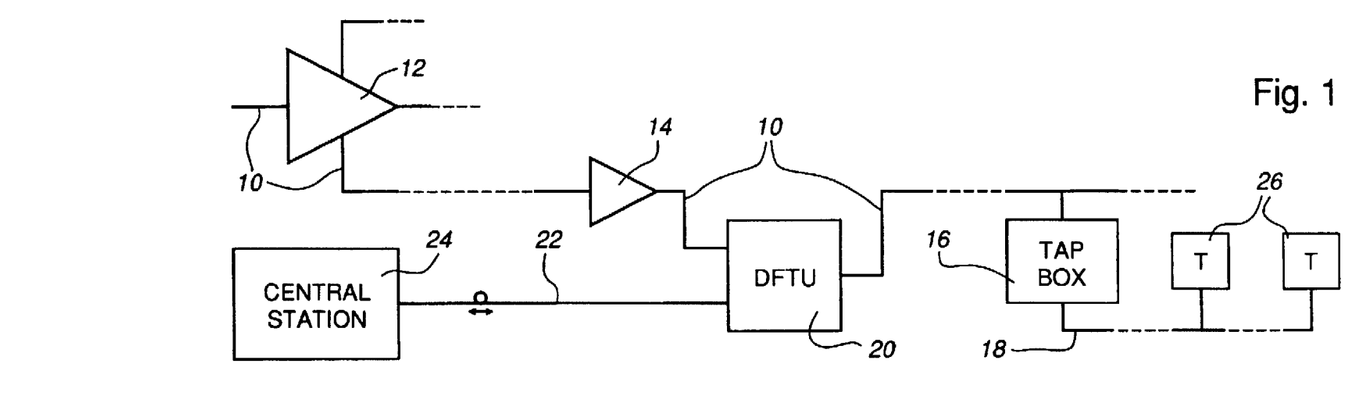
FIG. 1 schematically illustrates a cable television distribution network which provides bidirectional communications in accordance with an embodiment of this invention.

FIG. 1 illustrates parts of a conventional cable television distribution arrangement which is supplemented with an additional bidirectional transmission capability. Only those parts of the arrangement which are essential for understanding this invention are shown.

As shown in FIG. 1, coaxial cables 10 serve to supply television signals to a customer premises via a bridger amplifier 12, a line extender 14, a customer tap box 16, and a coaxial drop cable 18. Broken lines in FIG. 1 indicate that the arrangement includes multiple elements 14 to 18 for serving a multiplicity of customer premises in known manner.

For providing the additional bidirectional transmission capability, FIG. 1 illustrates that a digital optical fiber termination unit (DFTU) 20 is connected via a bidirectional optical fiber 22 to a central station 24. The DFTU 20 is inserted into the path of a coaxial cable 10 following a bridger amplifier 12 or line extender 14, and serves to supply to the coaxial cable 10 in the downstream direction (from the central station 24 to the customer premises) digital signals at frequencies above those of the analog television signals already carried by the cable 10, as further described below. The DFTU 20 also serves to supply in the upstream direction to the central station 24 digital signals which it receives from terminals (T) 26 in the customer premises via the coaxial cable 10. The terminals 26 in the customer premises are connected to the drop cable 18, and can comprise arbitrary types of terminal devices, such as television receivers, video recording devices, voice and/or data terminals, computer terminals, metering devices, and so on.

Figure 2:
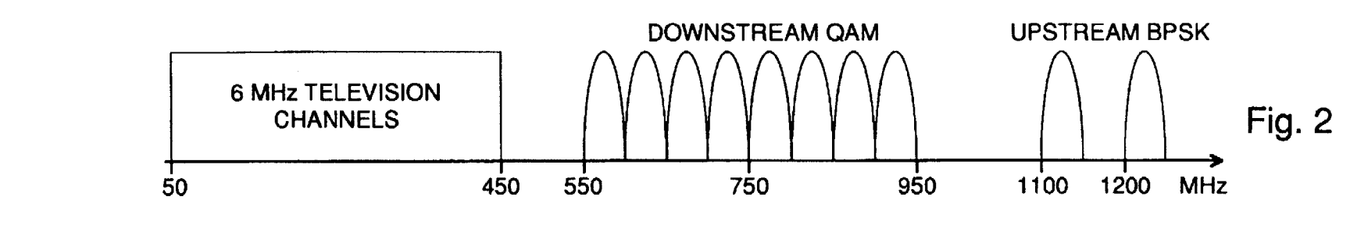
FIGS. 2 and 3 illustrate frequency spectra for downstream and upstream signals at different points in the network of FIG. 1.

FIG. 2 illustrates a spectrum of signals on the coaxial cable 10 between the DFTU 20 and the customer tap box 16. Conventional 6 MHz television channel signals and FM radio signals, supplied to the DFTU 20 via the bridger amplifier 12 and line extender 14, are transmitted in the downstream direction at frequencies from 50 MHz to about 450 MHz. In a frequency range from 550 to 950 MHz, QAM (quadrature amplitude modulated) digital signal channels are carried downstream from the DFTU 20. By way of example, FIG. 2 illustrates eight such channels each having a bandwidth of 50 MHz. Each such channel can be derived by the central station 24 from a respective SONET STS-3 signal at a bit rate of 155.52 Mb/s, and is converted into a signal with a TDM (time division multiplex) frame format as described below for transmission as an optical signal via the fiber 22 to the DFTU 20, as a QAM signal from the DFTU 20 via the coaxial cable 10 to the customer tap box 16, and as a BPSK signal from the customer tap box 16 via the coaxial drop cable 18 to the terminals 26.

FIG. 2 also illustrates for example two BPSK (binary phase shift keyed) digital signal channels for the upstream direction of transmission from the customer tap box 16 to the DFTU 20, at frequencies of 1100–1150 and 1200–1250 MHz. Switching between these channels in the tap box 16 and the DFTU 20 can be performed to select the better channel, only one of these channels being used at any given time.

Figure 3:
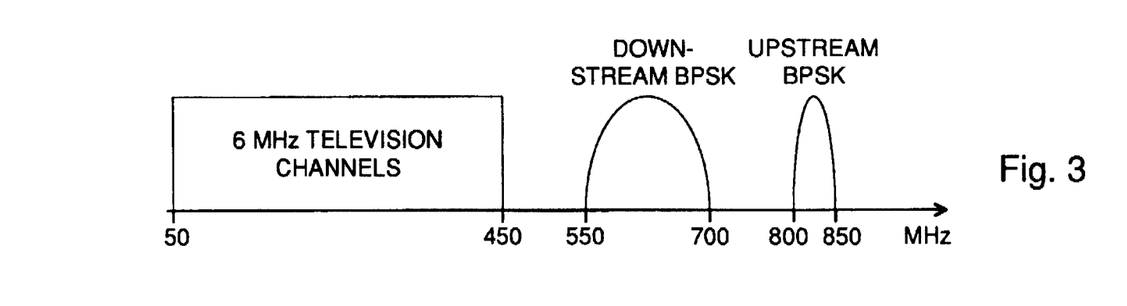

FIG. 3 illustrates a spectrum of signals on the coaxial cable drop 18. The spectrum up to about 450 MHz is the same as on the coaxial cables 10 as shown in FIG. 2. For the digital signal channels in both the downstream and upstream directions, the bit rate can be less than that required on the coaxial cable 10 downstream from the DFTU 20, but there is a greater need for noise immunity. Accordingly, BPSK signals are provided for both directions of transmission. The downstream digital signal channel is illustrated as a BPSK channel in a frequency range from 550 to 700 MHz, and the upstream digital signal channel is illustrated as a BPSK channel in a frequency range from 800 to 850 MHz.

It should be understood that the spectra illustrated in FIGS. 2 and 3 are given as only one possible example for carrying downstream and upstream signals in accordance with the description below, that numerous other possible arrangements can be provided for carrying these signals, and that the invention is not limited in this respect. Although not described further here, different wavelengths or other forms of multiplexing can conveniently be used for different signals on the optical fiber 22.

Figure 4:
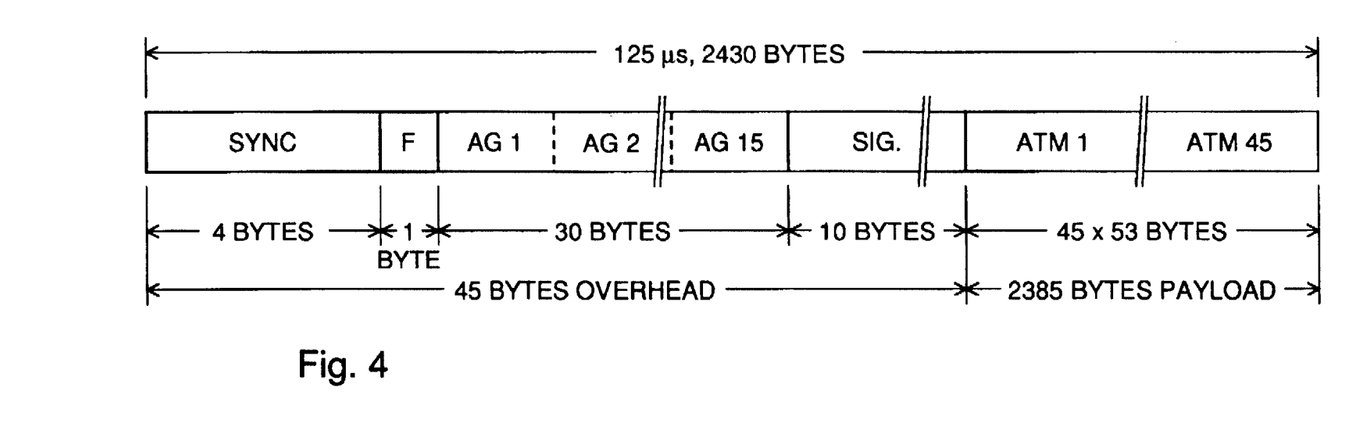
FIG. 4 illustrates a TDM frame structure for the downstream signals.

FIG. 4 illustrates one example of the TDM frame format of each downstream signal channel from the central station 24 to the terminals 26. As shown in FIG. 4, the frame comprises 2430 bytes each of 8 bits in a frame period of 125 µs, thus providing a bit rate of 155.52 Mb/s which is the same as the SONET STS-3 bit rate. The frame is divided into a payload of 2385 bytes which in this example carries 45 ATM (asynchronous transfer mode) cells (ATM 1 to ATM 45) each of 53 bytes, and overhead information of 45 bytes. The payload accommodates the 44.15 ATM cells which can be carried on average by an STS-3 signal, with the 45-th cell in the frame format being used for only about 1 in 6 frames. In the other frames, this 45-th ATM cell can be used to provide a downstream control and/or signalling channel with a bit rate of 360 kb/s. For example this can be used for allocating frame identities and time slots to the terminals for upstream isochronous traffic as is described below.

The 45 bytes of overhead information in the frame format of FIG. 4 are constituted by a synchronizing word (SYNC) of 4 bytes, a frame indicator F of 1 byte, fifteen asynchronous grants (AG 1 to AG 15) each of 2 bytes, and 10 signalling (SIG.) bytes. Briefly described, the SYNC word is used to synchronize the terminals 26 for transmission in the upstream direction. The frame indicator byte F is used to identify a particular upstream frame or frame type. The AGs are used to identify terminals 26 which are authorized to transmit an upstream ATM cell in the upstream frame, each terminal 26 having a distinct terminal identity or address as described below. The signalling bytes SIG. are used in an enhanced arrangement for modem signalling and control, as described later below.

For addressing purposes, each customer tap box 16 is assigned a respective box identity (BOX ID.) of 10 bits, and one ten-bit address is allocated as an address for broadcasting to all tap boxes. Thus the distribution network can accommodate a total of $2^{10}-1=1023$ tap boxes 16. In addition, each terminal 26 which is connected to any particular tap box 16 is assigned a respective terminal identity (T. ID.) of 6 bits. One six-bit address is allocated as an address for broadcasting to all terminals connected to the relevant tap box 16, and another six-bit address is allocated as an address for the tap box 16 itself, so that each tap box can have up to $2^6-2=62$ terminals connected to it. The distribution network as a whole can therefore accommodate a large number of terminals 26, each identified by an address of 10+6=16 bits or two bytes.

As described above, the payload of the downstream signal frames as shown in FIG. 4 comprises ATM cells each of which is addressed to a particular terminal 26. These ATM cells can comprise compressed digital television signals, voice and/or data signals, control signals, or any arbitrary form of signal which it is desired to transmit downstream. As is known, each ATM cell comprises 53 bytes, consisting of a header of five bytes or octets and a payload of 48 bytes or octets.

Figure 5:
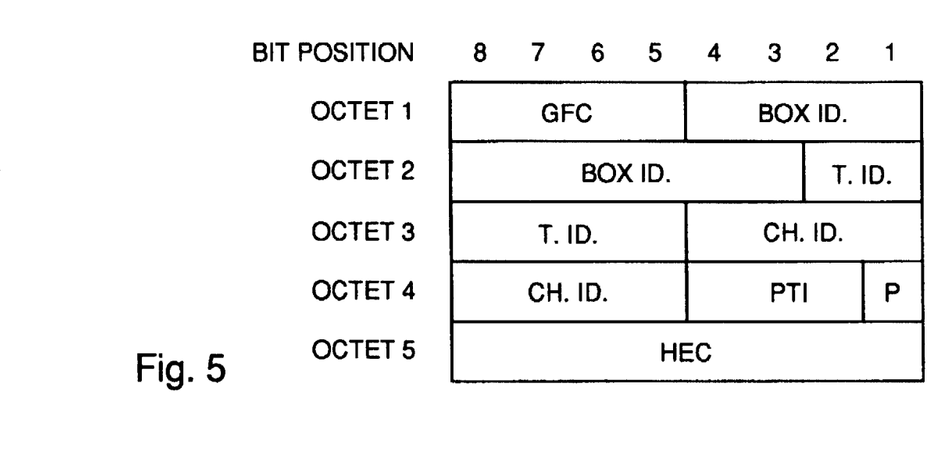
FIG. 5 illustrates a header for ATM cells in the downstream signals.

FIG. 5 illustrates in conventional manner the contents of the header of each ATM cell ATM 1 to ATM 45 in each frame as illustrated in FIG. 4. The header comprises a 4-bit generic flow control (GFC) field, a 3-bit payload type identifier (PTI) field, a cell loss priority (P) bit, and an 8-bit header error control (HEC) field which enables the ATM cell header to be identified, all with their known functions and known positions in the header. The remaining 24 bits of the header, which conventionally are constituted by an 8-bit virtual path identifier (VPI) and a 16-bit virtual channel identifier (VCI) of an ATM cell, are replaced as follows:

- 4 bits of octet 1, and 6 bits of octet 2, constitute the 10-bit BOX ID.;
- the other 2 bits of octet 2, and 4 bits of octet 3, constitute the 6-bit T. ID.; and
- the other 4 bits of octet 3, and 4 bits of octet 4, constitute an 8-bit channel identity (CH. ID.) which enables any of up to 64 logical channels to be identified for any particular terminal.

Transmission of upstream signals from the terminals 26 to the central station 24 is carried out in TDMA frames also having a frame period of 125 µs. Thus there is a one-to-one correlation between downstream frames and upstream frames. In each terminal 26, the timing of the upstream frames is synchronized by the SYNC word in the downstream frames, as is further described below. The bit rate in the upstream direction is less than the downstream bit rate, because generally less information needs to be transmitted upstream (e.g. digital television signals are transmitted downstream, but not generally upstream). More particularly, the upstream bit rate is selected to be 51.84 Mb/s, corresponding to the bit rate of a SONET STS-1 signal. In consequence, there are 810 bytes in each upstream frame.

Figures 6, 7, 8:
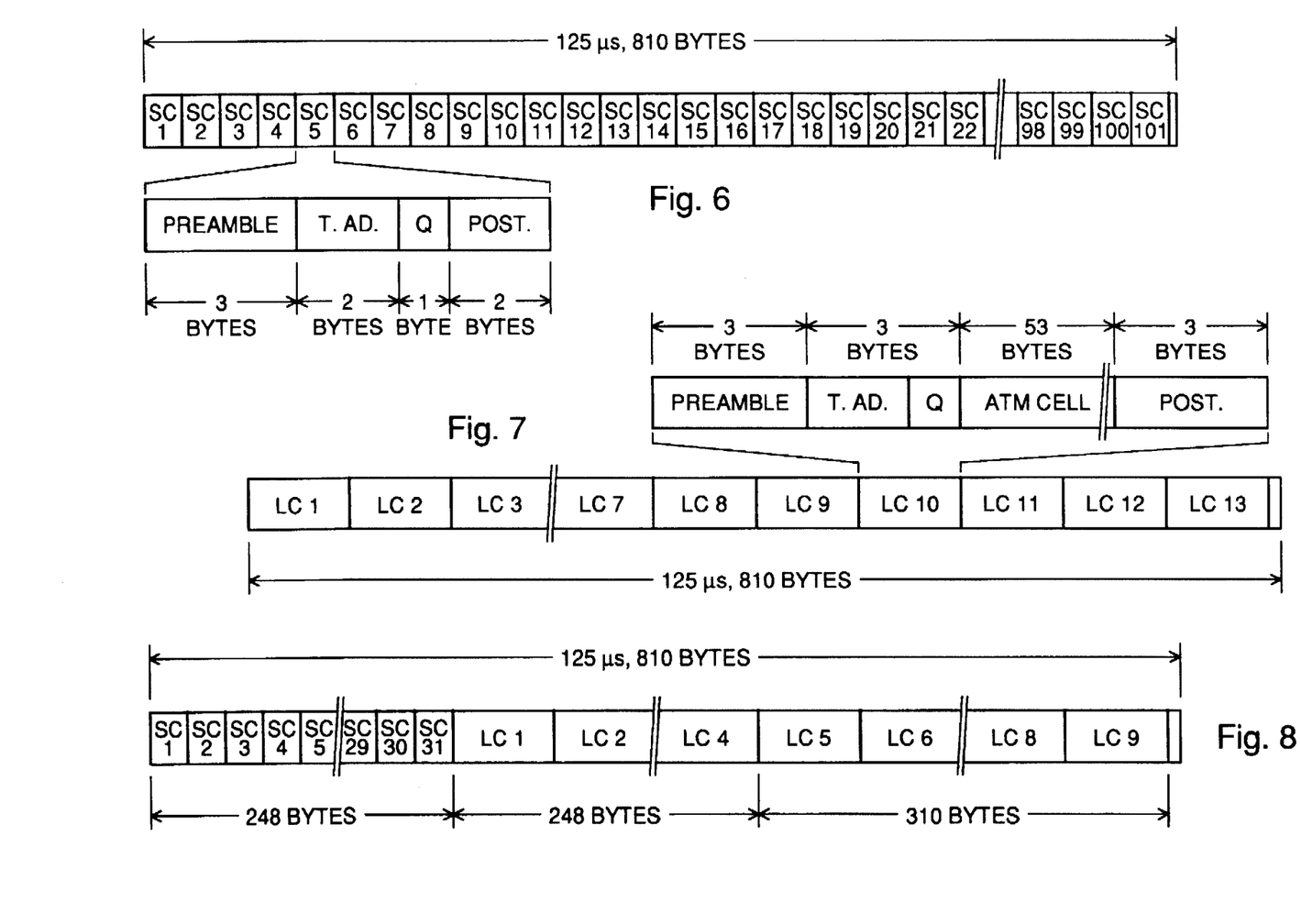
FIGS. 6 to 8 illustrate various TDMA frame structures for the upstream signals.

Each upstream frame can have any one of a number of frame identities, the particular identity of each upstream frame being determined by the frame indicator byte F in the corresponding downstream frame. As the byte F can have any one of 256 values, there can be 256 different upstream frame identities. FIGS. 6, 7, and 8 illustrate three possible frame identities, as further described below.

As discussed in the introduction, the upstream information to be transmitted from the terminals 26 to the central station 24 includes both isochronous and asynchronous signals, which may vary dynamically both from one terminal 26 to another and from one time to another for any particular terminal. There is also a need for polling all of the terminals. Allocating upstream bandwidth to the terminals in a fair and efficient manner, without introducing excessive traffic delays, therefore presents a significant problem. As described here, upstream bandwidth is allocated to the terminals in the form of what are termed short cells and long cells. The short cells are used isochronously by each terminal solely for transmitting polling information upstream to the central station. All other upstream traffic is transmitted in long cells, which may be assigned either statically for isochronous traffic or dynamically for asynchronous traffic. The invention is not, however, limited just to the provision of short and long cells as described here. On the contrary, other sizes of cells, for example one or more intermediate sizes of cells, may also be provided in particular for carrying isochronous upstream traffic such as voice signals. Alternatively, short cells can be lengthened to include upstream isochronous traffic. These and other alternatives will become apparent from the following description.

FIG. 6 illustrates an upstream TDMA frame of a first type which comprises only short cells SC. Each short cell comprises 8 bytes, so that the 810-byte frame accommodates 101 short cells SC 1 to SC 101, with 2 bytes left over at the end of the frame as indicated by a blank space at the right-hand end of the frame in FIG. 6. As indicated for the cell SC 5, each short cell comprises a preamble of 3 bytes, a terminal address T. AD. of 2 bytes, a queue size byte Q, and a postamble of 2 bytes. The preamble is provided to allow a receiving modem in the DFTU 20 to synchronize to the timing of the short cell, and the terminal address T. AD. comprises the BOX ID. and T. ID. of the terminal 26 transmitting the cell. The byte Q provides a measure of the size of a queue which the terminal maintains for asynchronous traffic to be transmitted upstream; this measure may be zero to indicate that there is no asynchronous traffic. In addition, the byte Q provides an indication of the type of cell. For example, the two most significant bits of the byte Q may indicate the type of cell (enabling four cell types to be identified), and the remaining six bits can indicate the asynchronous traffic queue size. The postamble provides a trailing sequence to reduce noise or interference which could be introduced in the network by an abrupt termination of the short cell transmission, and/or a guard space to accommodate possible inaccuracies in the marshalling process described below.

FIG. 7 illustrates an upstream TDMA frame of a second type which comprises only long cells LC. Each long cell comprises 62 bytes, so that the 810-byte frame accommodates 13 long cells LC 1 to LC 13, with 4 bytes left over at the end of the frame as indicated by a blank space at the right-hand end of the frame in FIG. 7. As indicated for the cell LC 10, each long cell comprises a preamble of 3 bytes, a terminal address T. AD. of 2 bytes, and a queue size byte Q as is the case for a short cell, followed by an ATM cell of 53 bytes and a postamble of 3 bytes. The ATM cell contains the upstream ATM header and a payload comprising up to 48 bytes of upstream isochronous or asynchronous traffic, the latter reducing the asynchronous traffic queue size of the terminal accordingly.

FIG. 8 illustrates an upstream TDMA frame of a third type which comprises both short cells SC and long cells LC. Subdividing the frame between short and long cells is facilitated in the terminal 26 by the fact that 31 short cells occupy the same number of bytes as 4 long cells. Thus in the upstream frame shown in FIG. 8, the first 248 bytes are constituted by 31 short cells SC 1 to SC 31 each of 8 bytes as described above, the next 248 bytes are constituted by 4 long cells LC 1 to LC 4 each of 62 bytes as described above, and the next 310 bytes are constituted by another 5 long cells LC 5 to LC 9, leaving 4 bytes over at the end of the frame.

It can be appreciated that the upstream frame can be subdivided in numerous other ways. For example, the frame of FIG. 8 could be modified by providing short cells following the long cell LC 4, for 248 bytes or the rest of the frame, or following the long cell LC 8. With these and additional cell sizes as mentioned above, numerous other subdivisions of the frame are possible.

Before further describing the allocation of bandwidth for upstream signals to the terminals, marshalling of the upstream signals is described with reference to FIG. 9. Marshalling refers to a method for ensuring that the upstream signals from different terminals 26 are all received in proper order at the DFTU 20.

Figure 9:
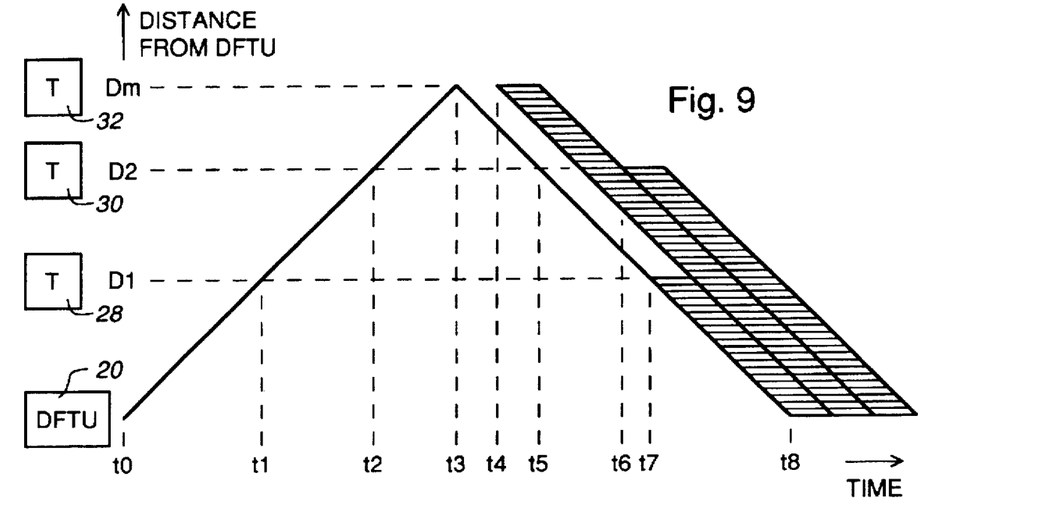
FIG. 9 is a distance-time diagram illustrating marshalling for the upstream signals.

FIG. 9 is a distance-time diagram illustrating three unrelated terminals 28, 30, and 32 having distances along the cable distribution network from the DFTU 20 represented by D1, D2, and Dm respectively, the distance Dm representing a maximum possible distance of any terminal from the DFTU. A downstream TDM frame is transmitted from the DFTU starting at a time t0, and reaches the terminals 28, 30, and 32 at times t1, t2, and t3 respectively. Each terminal is assigned a marshalling delay equal to twice the difference between the delay from the DFTU to the furthest terminal (i.e. t3–t0 in FIG. 9) and the delay from the DFTU to the particular terminal. For example, for the terminal 28 the marshalling delay is $2\{(t3-t0)-(t1-t0)\}$, which is equal to $2(t3-t1)$. For the terminal 30 the marshalling delay is $2(t3-t2)$, and for the terminal 32 at the maximum distance Dm the marshalling delay is zero.

Each terminal adds its marshalling delay to the time at which it receives the start of each downstream TDM frame to determine the start, at that terminal, of the corresponding upstream TDMA frame. Consequently, the terminals 32, 30, and 28 determine start times t3, t5, and t7 respectively for the same upstream frame. For transmission of a cell in successive time slots within the upstream frame, the terminal adds a time slot delay before transmitting the cell. For example, as shown in FIG. 9 it is assumed that the terminal 28 is assigned the first time slot in the upstream frame, so that its time slot delay is zero and it transmits a cell starting at the time t7. The terminal 32 is assigned the second time slot in the upstream frame, so that it transmits a cell starting at a time t4, which is delayed from the time t3 by a time slot delay for one cell. The actual delay depends on the upstream frame identity, and hence on the size of the cells (e.g. short or long cells) in the upstream frame. The terminal 30 is assigned the third time slot in the upstream frame, so that it transmits a cell starting at a time t6, which is delayed from the time t5 by a time slot delay for two cells. In consequence, the cells from the different terminals are received in their proper order at the DFTU starting at a time t8.

It can be seen from the above description that the frame identity byte F, contained in each downstream frame, enables the central station 24 to determine the nature of the corresponding upstream frame, for example so that this has a format as shown in any of FIGS. 6 to 8. In other words, the central station 24 controls the upstream frame formats, and can define superframe structures for the upstream frames as desired. An example of this is further described below.

The central station 24 maintains a polling list which contains, for each terminal in the network according to its terminal address T. AD., an upstream frame identity and time slot number which is assigned to the terminal for transmission of an isochronous short cell as described above, an upstream frame identity and time slot number which may be assigned to the terminal for transmission of any isochronous traffic in a long cell, and a measure of the queue size for any asynchronous traffic to be transmitted by the terminal. Long cell time slots for asynchronous traffic are allocated by the central station 24 by repeatedly scanning the list of queue sizes and allocating long cell time slots to the terminals with the largest (non-zero) queue sizes. The queue sizes in the list are updated from the Q bytes of the terminals contained in the upstream short and long cells, as described above.

The operation of the central station 24 in these respects is best explained by the following example, which is simplified for convenience. In this example, it is assumed for simplicity that the central station 24 defines an upstream superframe format in which 16 upstream frames form a superframe. The 16 frames are assigned frame identity bytes F and frame formats as shown in FIG. 6, 7, or 8 for example as follows:

As this allocation illustrates, the odd-numbered upstream frames in each superframe are identified by frame identity bytes F in the corresponding downstream frames having consecutive values from 16 to 23. These frames all have a frame format as shown in FIG. 7, comprising only long cells, and are used for isochronous and/or asynchronous traffic from the terminals as further described below. Frames 2 and 10 in each superframe are identified by frame identity bytes F in the corresponding downstream frames having values of 32 and 33 respectively. These frames have a frame format as shown in FIG. 6, comprising only short cells, and are used for isochronous polls of the queue sizes of the terminals. The other even-numbered frames in each superframe are identified by frame identity bytes F in the corresponding downstream frames having consecutive values from 48 to 53. These frames all have a frame format as shown in FIG. 8, comprising both short cells, which are used for isochronous polls of the queue sizes of the terminals, and long cells, which it is assumed here are used only for asynchronous traffic from the terminals, but could equally be used for isochronous traffic from the terminals.

The above allocation provides in each upstream superframe a total of $(2\times101)+(6\times31)=388$ short cells, each of which can be supplied from a respective terminal 26. Thus this simple example provides for 388 terminals in the network. Obviously, larger numbers of terminals can be accommodated with more short cells in each superframe, e.g. by providing longer superframes and a different distribution of frames in the superframe.

Each terminal is assigned by the central station 24, through the 45-th ATM cell in the downstream frames when this is used for control and signalling purposes, and/or through the use of other ATM cells in the downstream frames and similarly addressed to the respective terminals, with a frame identity and short cell time slot number for transmission of a short cell in each upstream superframe. For example, an arbitrary terminal may be assigned the frame identity 33 and the time slot number 19 for its short cells. The terminal stores this information, and monitors the downstream signal frames as shown in FIG. 4. On detecting the SYNC word in the first four bytes of each downstream frame, the terminal checks the next byte F to see whether it matches the assigned value of 33. If it does (as can be seen from above this will occur in the 10-th of every 16 frames), then the terminal transmits a short cell, as shown in FIG. 6, after a delay equal to the sum of the marshalling delay for that terminal (which is also stored in the terminal and is determined as described below) and the time slot delay for the first 18 short cells in the upstream frame, as illustrated in FIG. 9. The short cell transmitted by the terminal is thereby provided to the DFTU 20 as the cell SC 19 in the 10-th frame of each upstream superframe.

It can be appreciated that, rather than being assigned a time slot number as described above, each terminal could be supplied by the central terminal 24 with an actual time slot delay for transmission of its cells.

In a similar manner, all of the terminals in the network are enabled to transmit one short cell in each upstream superframe. This is achieved with relatively little information being required in the downstream direction for polling the

| Frame:  | 1  | 2  | 3  | 4  | 5  | 6  | 7  | 8  | 9  | 10 | 11 | 12 | 13 | 14 | 15 | 16 |
|---------|----|----|----|----|----|----|----|----|----|----|----|----|----|----|----|----|
| Byte F: | 16 | 32 | 17 | 48 | 18 | 49 | 19 | 50 | 20 | 33 | 21 | 51 | 22 | 52 | 23 | 53 |
| FIG. #: | 7  | 6  | 7  | 8  | 7  | 8  | 7  | 8  | 7  | 6  | 7  | 8  | 7  | 8  | 7  | 8  | terminals, through the provision of assigned short cells and the single frame identity byte F in each downstream frame. It can be appreciated that any terminal can be enabled to transmit short cells more frequently, in a similar manner to that described below for isochronous traffic in long cells, or less frequently through the use of longer superframes or a super-superframe format for the upstream frames.

Isochronous traffic in long cells is accommodated in a similar manner. The above allocation provides for isochronous traffic to be included in the long cells (13 per frame as shown in FIG. 7) of the odd-numbered frames of each upstream superframe. However, different terminals may require different bit rates for isochronous traffic.

One long cell per superframe can be allocated to any terminal for isochronous traffic to provide a payload bit rate up to 192 kb/s (in this example). A longer upstream superframe enables this bit rate granularity to be reduced; for example a granularity of 64 kb/s can be provided by an upstream superframe of 48 frames. One long cell per superframe is allocated to a terminal by the central station 24 in the same manner as described above. Thus the terminal is assigned a frame identity value, for example 17, and a time slot number, for example 6, in accordance with which it checks for downstream frames having the frame identity byte F equal to 17 and, on such detection, transmits a long cell after the marshalling delay for the terminal plus the time slot delay for the first 5 long cells of the upstream frame.

For higher bit rate isochronous traffic, the terminal can be assigned multiple long cells in each upstream superframe. This can be done by providing multiple assignments of frame and time slot numbers to any terminal, but this undesirably complicates the design of the terminal. Alternatively, it can be done by providing the same frame identity more than once in each superframe, but this involves the complication that all of the terminals which are enabled by the repeated frame identity will have their isochronous traffic transmission rates similarly increased. Preferably, higher bit rate isochronous traffic is provided for through a masking field which is also supplied by the central station to, and stored in, each terminal along with the frame identity and time slot number.

For example, if a terminal requires an isochronous traffic bit rate of 1.536 Mb/s, which corresponds to a rate of one long cell in every two upstream frames, then it can be assigned a frame identity value equal to any of the values 16 to 23 in accordance with the above allocation, together with a masking field which instructs it to ignore the three least significant bits in its comparison of the frame identity byte F to identify upstream frames in which it can transmit. Thus for example the terminal may be assigned a frame identity value of 00010XXX (where X indicates a "don't care" bit) and a masking field of 00000111, in which a binary 0 indicates a bit to be compared and a binary 1 indicates a bit which is not compared. The terminal then performs a comparison, as described in detail below with reference to FIG. 12, of its assigned value with the frame identity byte F in each downstream frame in conjunction with the masking field, thereby producing (in this example) a match for each odd-numbered upstream frame. The terminal then transmits a long cell in the assigned time slot of each such upstream frame, thereby achieving the desired isochronous traffic bit rate.

A similar procedure can be provided for arbitrary bit rates which are multiples of the granularity (one long cell per superframe) of the network. This procedure can also be applied if desired to the short cell assignments to the terminals, as mentioned above, and equally to any intermediate sizes of cells which may be provided for isochronous traffic.

The remaining long cells in each upstream superframe, i.e. long cells in the odd-numbered frames which are not being used for isochronous traffic, and long cells in the frames having the format shown in FIG. 8, are available for asynchronous traffic. As described above, the central station 24 maintains an asynchronous traffic queue size list and updates this for each terminal in accordance with the information provided in each byte Q from the terminal, and allocates long cells to the terminals in accordance with this list.

To this end, for each terminal 26 which the central station 24 determines from the asynchronous traffic queue size list is to be allocated an available long cell time slot in an upstream frame, the central station inserts the two-byte address T. AD. of that terminal in the corresponding downstream frame as one of the fifteen asynchronous grants AG 1 to AG 15 shown in FIG. 4. The number of the particular asynchronous grant which is used by the central station indicates the number of the long cell time slot which is to be used by the terminal for upstream transmission of a long cell. It will be noted that there are at most (as so far described) 13 long cell time slots as shown in FIG. 7 in any upstream frame, so that the first 13 of the 15 asynchronous grants AG in the downstream frame are sufficient to identify any upstream long cell time slot for asynchronous traffic.

For example, if the central station 24 determines that the eighth time slot in the fifth frame of an upstream superframe is available for asynchronous traffic, then in the corresponding downstream frame, having the byte F value of 18 in accordance with the above allocation, it inserts the address T. AD. of a terminal 26 to which it wishes to allocate that time slot as the asynchronous grant AG 8. Each terminal having a non-zero asynchronous queue size monitors the asynchronous grants AG in each downstream frame for its own terminal address. On detecting its own address in any of the asynchronous grants, e.g. AG n, the terminal transmits a long cell in the n-th long cell time slot of the corresponding upstream frame, in accordance with its marshalling delay and a time slot delay for the preceding n−1 long cell time slots (and for any preceding short cell time slots in the case of the upstream frame format of FIG. 8).

In this manner, all of the available long cell time slots can be dynamically allocated to the terminals requiring them, as determined by the central station 24 from the asynchronous traffic queue size list which is also dynamically updated.

As described above, each terminal 26 must store its own marshalling delay in order to determine the time at which to send upstream cells. Each terminal must also store its own address T. AD. On initial connection of a terminal to the network, this is achieved in the following manner.

The central station 24 initially sends downstream a broadcast message which contains a serial number of a terminal to be connected, an address T. AD. allocated to the terminal, and an allocation of a long cell for asynchronous traffic in the middle of a succession of available long cell time slots. The terminal recognizes its serial number, which for example is hard-wired into the terminal on manufacture, stores the allocated terminal address, and responds by transmitting a long cell upstream in the allocated time slot. The central station 24 or the DFTU 20 determines the marshalling delay required for the terminal from the timing of the long cell as received at the DFTU, and communicates this to the terminal in a downstream ATM cell.

The provision of communications in accordance with the invention as described above provides significant advantages. In particular, all of the terminals are enabled to communicate polling signals (the terminal address and asynchronous queue size) in a periodic manner with a relatively small demand for downstream bandwidth. Isochronous traffic from the terminals in the upstream frames, at different data rates for different terminals, is easily accommodated, it being observed that any terminal can request long cell time slots for isochronous traffic by means of an asynchronous long cell addressed to the central station. Furthermore, asynchronous traffic can be accommodated to fill substantially all of the upstream bandwidth capacity, without requiring any collision detection scheme for upstream signals from different terminals. This enables a maximum response time for asynchronous upstream signals to be guaranteed by the central station, as is desired for example for responding to customers' television program selection signals.

The central station 24 can be constituted by one or more computers for maintaining the polling and asynchronous queue size lists as described above, and conventional hardware for producing and delivering the downstream TDM frames, for receiving and responding to the upstream TDMA frames as described above, and generally for communicating with the terminals 26. The DFTU 20 can be a simple device for receiving the downstream optical signal and modulating the downstream frames, and for receiving the upstream signal and forwarding this as an optical signal to the central station. It is noted here that some or all of the functions of the central station 24 can alternatively, if desired, be carried out at the DFTU 20.

Figure 10:
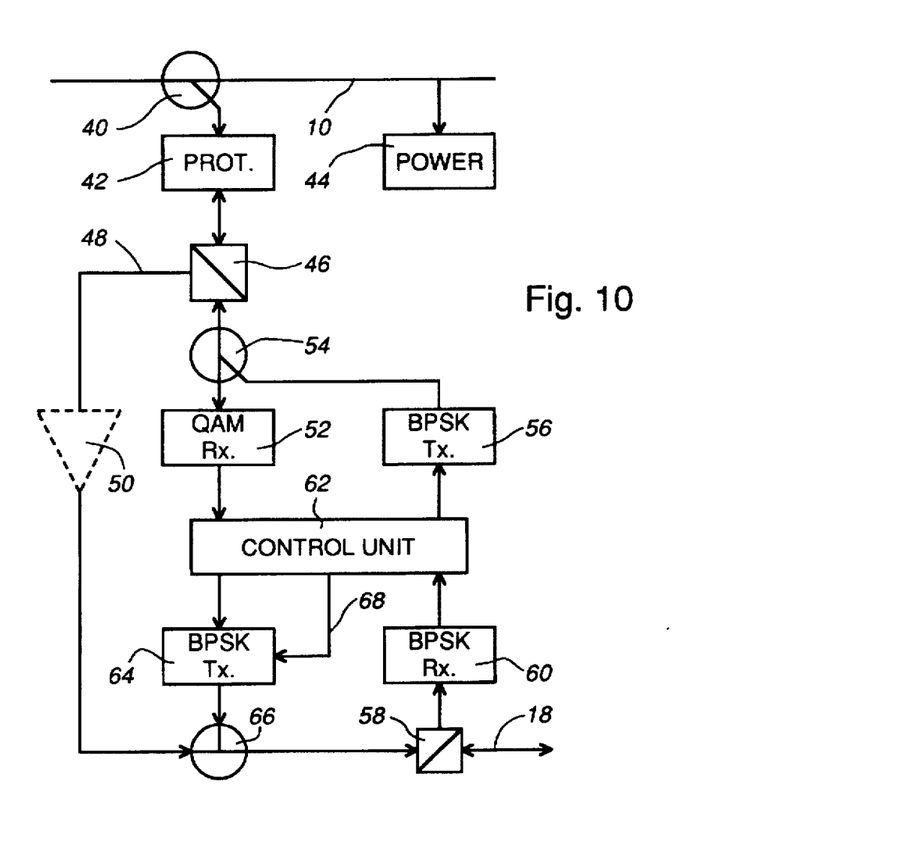
FIG. 10 illustrates a block diagram of a tap box of the network.

Each tap box 16 can conveniently have a form as illustrated in FIG. 10. Referring to FIG. 10, the tap box includes a directional coupler 40 and a protection unit 42 via which signals are derived from the coaxial cable 10 in conventional manner, and a power supply unit 44 via which power for the tap box is derived from the coaxial cable 10 in known manner. Upstream signals are also supplied to the cable 10 via the protection unit 42 and the coupler 40.

A diplexing filter 46 separates the downstream 6 MHz television channels onto a path 48 which may optionally include an amplifier 50, shown in broken lines. The downstream QAM signals as described above are supplied from the diplexing filter 46 to a QAM receiver (Rx) unit 52 via a directional coupler 54, and upstream BPSK signals are supplied from a BPSK transmitter (Tx) 56 via the directional coupler 54 to the diplexing filter 46. The transmitter 56 is supplied with upstream cells from the terminals connected to this tap box via the coaxial cable drop 18, a diplexing filter 58, a BPSK receiver unit 60, and a control unit 62 which can also produce its own upstream cells. The control unit 62 also supplies a downstream signal to a BPSK transmitter unit 64, whose output is combined with the downstream 6 MHz television channels from the path 48 in a mixer 66 and supplied to the cable drop 18 via the diplexing filter 58. This downstream signal has the frame format of FIG. 4, but the transmitter unit 64 is controlled by the control unit 62, via control paths represented by a line 68, to supply to the cable drop 18 only those ATM cells received by the QAM receiver unit 52 which are intended for terminals connected to this tap box, other ATM cells being replaced by null cells.

Figure 11:
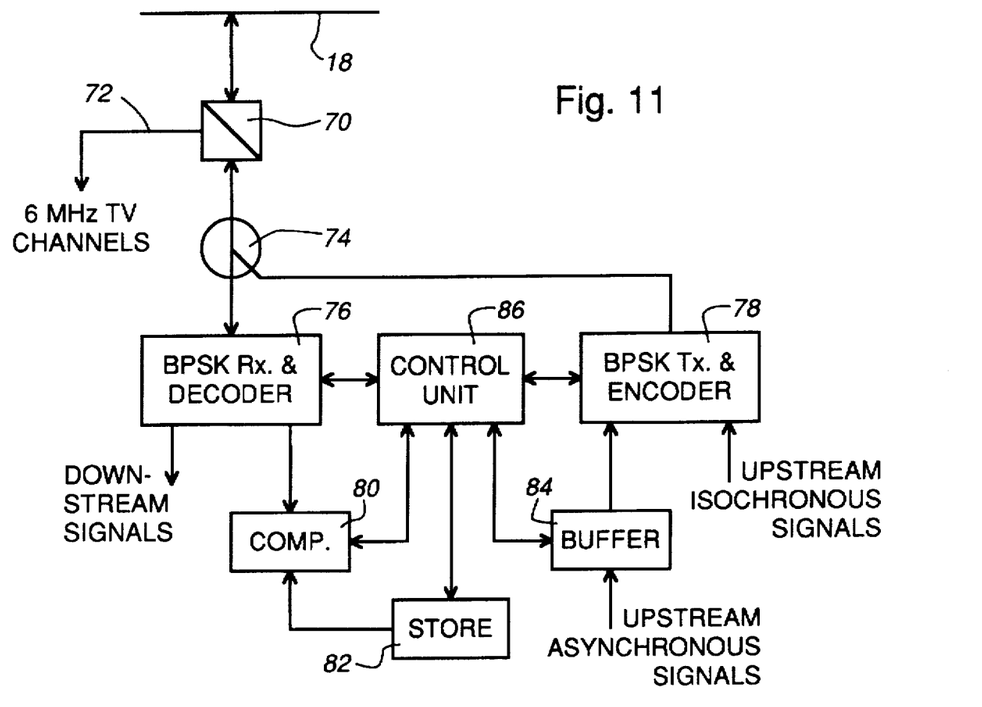
FIG. 11 illustrates a block diagram of a terminal of the network.

FIG. 11 shows a block diagram of a terminal 26, in which the downstream 6 MHz television channels are separated by a diplexing filter 70, coupled to the coaxial drop cable 18, onto a path 72. The downstream BPSK signals are supplied from the diplexing filter 70 via a directional coupler 74 to a BPSK receiver (Rx) and decoder unit 76, the coupler 74 also coupling upstream BPSK signals to the diplexing filter 70 from a BPSK transmitter (Tx) and encoder unit 78. The unit 76 supplies downstream signals from the ATM cells in the frame format of FIG. 4 to a device (e.g. a digital television receiver or a computer) for which these signals are intended, and supplies the bytes F and AG to a comparison (COMP.) unit 80 for comparison with values stored in a store 82. The unit 78 is supplied with isochronous signals, and asynchronous signals via a buffer 84, for transmission upstream under the control of a control unit 86 which is responsive to the output of the comparison unit 80 and controls all of the units 76 to 84.

More particularly, the control unit 86, in conjunction with the comparison unit 80 and the store 82, operates to detect the SYNC word in each downstream frame; to recognize downstream ATM cells addressed to the terminal and thereby to store in the store 82 allocated information such as the terminal address T. AD., frame identity values, masking fields, and cell numbers for upstream transmission of short cells and long cells for isochronous traffic, and the marshalling delay for the terminal, all as described above; to detect when the byte F of a downstream frame matches a stored frame identity value as masked by the masking field; and to detect when the terminal's address appears in any of the asynchronous grants AG of a downstream frame for upstream transmission of asynchronous traffic. In addition, the control unit 86 controls the timing of the terminal and in particular the unit 78 for upstream transmission, monitors the contents of the buffer 84 which constitutes the asynchronous queue for the terminal, supplies polling information accordingly for short cells to be transmitted upstream via the unit 78, and also generates asynchronous signals for upstream transmission for control of the terminal and other purposes such as television program selection.

Figure 12:
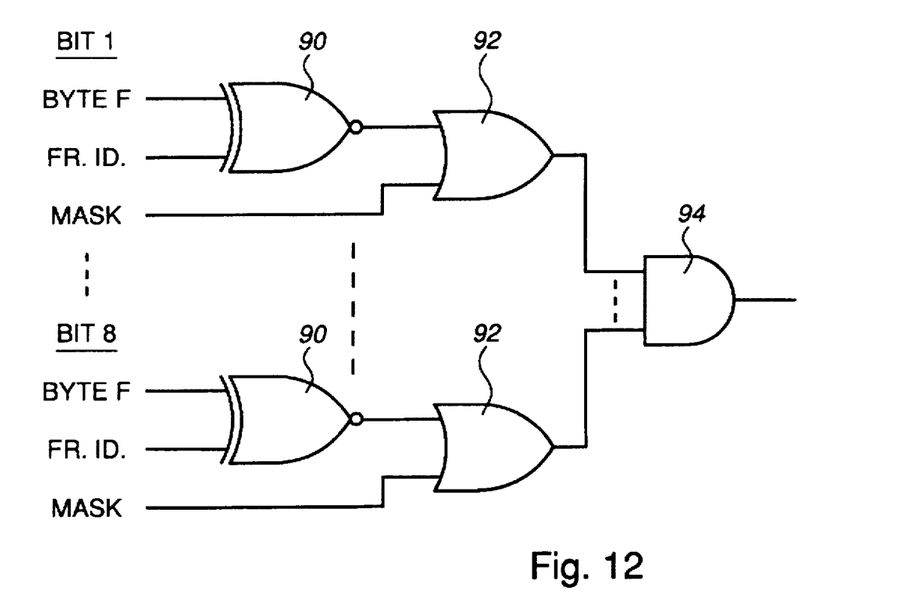
FIG. 12 illustrates an arrangement for masked frame identity comparison in the terminal.

FIG. 12 illustrates in greater detail one way in which the comparison unit 80 can be arranged to compare the byte F in each downstream frame with the frame identity and masking field stored in the store 82. As illustrated in FIG. 12, each of the eight bits of the byte F in each downstream frame is supplied to one input of a respective Exclusive-NOR gate 90, to another input of which is supplied the corresponding bit of the frame identity FR. ID. assigned to the terminal and stored in the store 82. The output of each gate 90, which is a binary 1 when the input bits match, is supplied to one input, and the corresponding bit of the masking field MASK is supplied to another input, of a respective OR gate 92. The outputs of the eight OR gates 90 are supplied to inputs of an AND gate 94, whose output is a binary 1 when the FR. ID. and byte F bits match in all bit positions for which the masking field bit is a binary 0.

Although the network communications as described above provides significant advantages, it can be further enhanced. In particular, it can be seen from FIG. 6 that there is a relatively large overhead involved in the transmission of each short cell, for which the cell size is 8 bytes for 3 bytes of information. For a long cell as shown in FIG. 7 the percentage of overhead is much smaller, but the overhead can still be significant. For other cell sizes, between the short and long cell sizes, the overhead may also be significant.

The need for this overhead, in particular the preamble, arises because the upstream signal modulators, which form part of the BPSK Tx. and encoder units 78 in the terminals 26 and part of the BPSK Tx. unit 56 in the tap boxes 16, operate asynchronously, so that the demodulators in the BPSK Rx. units 60 in the tap boxes 16 and in the DFTU 20 must synchronize themselves in frequency and phase to the incoming signal before the transmitted information can be reliably received. Thus the upstream TDMA frames are constituted by time division multiplexed cells from different terminals whose positions within the received frames are not synchronously determined.

This disadvantage can be avoided by using more sophisticated, and more costly, modem technology, and more particularly by using synchronous modems. In this case the BPSK transmitter and receiver units are all kept in exact phase alignment by signals fed downstream from the DFTU 20. These signals are carried in the 10 signalling bytes SIG. in each downstream frame as shown in FIG. 4. The phase alignment can be carried out in known manner, and any convenient signalling format can be used to communicate necessary adjustments to synchronize each modem; consequently details in these respects are not necessary here.

Using synchronous modems in this manner can avoid any need for overhead bytes for the upstream transmission of cells. In this case each short cell can consist of only the three bytes for the terminal address T. AD. and the byte Q, so that one upstream frame of 810 bytes can accommodate exactly 270 short cells. Each long cell can consist of 54 bytes, namely the byte Q and the ATM cell of 53 bytes in which the header can be used to carry the terminal address T. AD., so that one upstream frame of 810 bytes can accommodate exactly 15 long cells. (Each long cell can alternatively consist of only the ATM cell of 53 bytes by using the GFC field in the ATM cell header to carry the asynchronous queue size.) It is for this reason that the downstream frame as shown in FIG. 4 includes 15 asynchronous grants AG, to correspond to the maximum number of 15 long cells which can be carried in an upstream frame. It should also be noted that this arrangement maintains a convenient relationship between short and long cells, 18 short cells having the same duration as one long cell, so that combining short and long cells in the same upstream frame, as described above with reference to FIG. 8, is facilitated. Intermediate sizes of cells, for example for carrying voice traffic, could conveniently consist of 6, 9, 18, or 27 bytes each in such an arrangement.

Although particular embodiments of the invention have been described in detail, it should be appreciated that numerous modifications, variations, and adaptations may be made without departing from the scope of the invention as defined in the claims.

For example, as already indicated, the sizes of the short and long cells may be varied to suit particular requirements, and other sizes of cells may be provided to suit particular needs or types of upstream traffic. Alternatively, or in addition, different sizes of short cells may be provided to include one or more appended bytes for upstream isochronous traffic from the terminals, e.g. for an upstream voice signal. In addition, it should be appreciated that short cells which only serve for communicating polling signals (i.e. the byte Q) upstream to the central station 24 can be dispensed with for terminals which are currently allocated cells for transmitting upstream isochronous traffic, to the extent that such cells already include the byte Q containing the asynchronous queue size information for these terminals.

In addition, it should be appreciated that the particular bit rates, RF spectra, modulation methods, and so on described above are given purely by way of example, and the invention is not in any way limited thereto. For example, as described above the communications network provides a one-to-one correlation between downstream and upstream frames. i.e. they both have a frame period of 125 μs and the downstream frames determine the timing of the upstream frames. While this is particularly convenient for providing the frame identity byte F and asynchronous grants AG for each upstream frame as described above, the invention is not limited to this arrangement. Instead, for example, a single downstream frame could serve to identify and provide asynchronous grants for a plurality of upstream frames having a period which is a multiple of the downstream frame period.

Likewise, different and unrelated bit rates may be used for upstream and downstream transmission. For example, for downstream transmission, 64-QAM may be used to provide a bit rate of about 28 Mb/s in a 6 MHz channel. The frame periods are also not fixed, but preferably are conveniently related to 125 μs for consistency with telecommunications networks. The downstream frames need not have the same format as shown in FIG. 4, and in particular can carry different payloads with arbitrary contents, such as a mixture of different types of isochronous and asynchronous traffic.

Furthermore, the invention is not limited to the physical form of the network as described above. In particular, all or part of the network as described above may be modified by dividing it into two parts: a first part in which the central station 24 communicates with each of the tap boxes 16 so that the central station treats the tap boxes as terminals, and a second part in which each tap box communicates with and acts as a central station for the terminals 26 connected to it, thereby providing a local area network for the customer's premises. In view of the shorter distances and lower bit rates for signals between the terminals and the tap boxes than between the tap boxes and the central station 24, this division facilitates the use of the two different modem technologies as described above on the different parts of the network, i.e. synchronous modems requiring little or no overhead in the first part of the network, and asynchronous modems requiring overhead for the upstream cells in the second part of the network.

In addition, it is observed that the subdivision of the ATM cell header into the identities BOX ID., T. ID., and CH. ID. as described above with reference to FIG. 5 is not fixed and can be varied, for example to accommodate different numbers of terminals connected to the same tap box. In particular, one or more masking fields can be allocated, e.g. to each tap box, for masking these identities in a similar manner to that described above for masking of the frame identity byte F, so that the boundaries of these identities can be different for different tap boxes and can be changed for any tap box over time.

It is also observed that, although the communications network as described above is particularly advantageous in providing in the downstream frames both the frame identity byte F, for identifying corresponding upstream frames for polling signals from the terminals, and the asynchronous grants AG, for identifying terminals which are allocated upstream time slots for asynchronous signals, more generally each of these could be provided independently of the other. Thus the frame identity byte F and the asynchronous grants AG constitute different forms of authorization information included in the downstream overhead information for authorizing terminals to transmit in respective time slots in upstream frames. In accordance with this invention, either of these forms of authorization information, or both of them together, can be provided in any particular communications network.

What is claimed is:

1. A method of communicating information in TDM frames in a downstream direction from a central station of a distribution network to a plurality of terminals of the network and in TDMA frames in an upstream direction from the plurality of terminals to the central station, each terminal having a respective terminal identity, comprising the steps of:

transmitting in the downstream frames distribution information and overhead information, the overhead information comprising synchronization information for synchronizing the plurality of terminals to the upstream frames and authorization information for authorizing selected terminals each to transmit in an upstream frame, the authorization information comprising the terminal identity of each terminal authorized to transmit in an upstream frame and an indication identifying a time slot in the upstream frame in which each terminal is authorized to transmit, said indication being constituted by a relative position of the terminal identity in the downstream frame; and in each terminal, storing the respective terminal identity and transmitting information in a respective time slot in an upstream frame in response to the authorization information comprising the respective terminal identity stored in the terminal.

2. A method of communicating information between a central station and a plurality of terminals in a distribution network, comprising the steps of:

at the central station, determining downstream TDM frames, for transmission of distribution information and overhead information from the central station to the plurality of terminals, and upstream TDMA frames, for transmission of information in respective time slots from the terminals to the central station, each upstream frame having a frame identity which is included in the overhead information of a corresponding downstream frame;

in each terminal, buffering asynchronous information for transmission upstream, storing an upstream frame identity and a time slot identity assigned to the terminal, monitoring the overhead information in the downstream frames for the stored upstream frame identity, and, in response to detection of the stored upstream frame identity in the overhead information in a downstream frame, transmitting, in the assigned time slot of the corresponding upstream frame, information comprising an indication of a queue size of the buffered asynchronous information;

at the central station, allocating time slots in the upstream frames to terminals in accordance with the queue size indications from the terminals, and including in the overhead information in the corresponding downstream frames an indication of each terminal which is allocated such a time slot and the time slot which it is allocated; and in each terminal having buffered asynchronous information, monitoring the overhead information in the downstream frames for the indication of the terminal and, in response to detection of the indication of the terminal in the overhead information in a downstream frame, transmitting buffered asynchronous information in the allocated time slot of the corresponding upstream frame.

3. A method as claimed in claim 2 wherein the downstream and upstream frames have the same frame period, and further comprising the step of including synchronization information in the overhead information in the downstream frames for synchronizing the terminals to the upstream frames.

4. A method as claimed in claim 3 and further comprising the step of storing in each terminal information for delaying timing of upstream frames at the terminal by a delay that is inversely dependent on a distance of the terminal from the central station.

5. A method as claimed in claim 2 wherein the time slots in the upstream frames allocated for the transmission of the buffered asynchronous information are larger than the time slots assigned to the terminals for the transmission of information comprising the indication of a queue size of the buffered asynchronous information.

6. A method as claimed in claim 2 wherein m time slots in the upstream frames allocated for the transmission of the buffered asynchronous information have the same size as n time slots assigned to the terminals for the transmission of information comprising the indication of a queue size of the buffered asynchronous information, where m and n are integers and n>m.

7. A method as claimed in claim 6 wherein m is equal to one.

8. A method as claimed in claim 2 wherein the indication of the time slot which each terminal is allocated for transmission of buffered asynchronous information is constituted by a relative position of the indication of the terminal in the overhead information in the downstream frame.

9. A method as claimed in claim 2 and further comprising the step of transmitting, from at least one of the terminals, isochronous information from the terminal as part of the information comprising an indication of a queue size of the buffered asynchronous information in the assigned time slot of the respective upstream frame.

10. A method as claimed in claim 9 and further comprising storing in said at least one of the terminals a masking field for masking part of a detection in the terminal of the stored upstream frame identity in the overhead information in the downstream frames.

11. A method as claimed in claim 2 and further comprising the steps of, in at least one terminal having isochronous information to be transmitted upstream, storing an upstream frame identity and a time slot identity assigned to the terminal by the central station for transmission of the isochronous information, monitoring the overhead information in the downstream frames for this stored upstream frame identity, and, in response to detection of this stored upstream frame identity in the overhead information in a downstream frame, transmitting the isochronous information in the assigned time slot of the corresponding upstream frame.

12. A method as claimed in claim 11 and further comprising storing in said at least one terminal a masking field for masking part of a detection in the terminal of the stored upstream frame identity for transmission of the isochronous information in the overhead information in the downstream frames.

13. A method of allocating upstream transmission capacities to terminals in a distribution network in which distribution information and overhead information are transmitted in TDM frames in a downstream direction from a central station to the terminals, comprising the steps of:

providing, for transmission from the terminals to the central station, upstream TDMA frames in which there are at least two different sizes of time slots, and identifying each upstream frame by a frame identity in the overhead information in a corresponding downstream frame so that the terminals can determine the time slots for each upstream frame;

assigning time slots of a first size to at least some of the terminals for transmitting upstream queue size information for buffered asynchronous information to be transmitted upstream from the terminal, each such terminal storing an identity of an assigned time slot and an upstream frame identity for transmitting the queue size information, monitoring the overhead information in the downstream frames to detect the assigned frame identity, and transmitting the queue size information in the assigned time slot in the corresponding upstream frame; and allocating time slots of a second size to terminals in dependence upon the queue size information by transmitting from the central station in the overhead information in the downstream frames an indication of each terminal which is allocated such a time slot and the time slot which it is allocated, each terminal having buffered asynchronous information to be transmitted monitoring the overhead information in the downstream frames to detect the indication of the terminal and transmitting buffered asynchronous information in the allocated time slot of the corresponding upstream frame.

14. A method as claimed in claim 13 wherein the indication of each time slot of the second size which is allocated for transmission of buffered asynchronous information is constituted by a relative position of the indication of the terminal in the overhead information in the downstream frame.

15. A terminal for a communications system in which information is communicated in TDM frames in a downstream direction from a central station of a distribution network to a plurality of terminals of the network, and in TDMA frames in an upstream direction from the plurality of terminals to the central station, the downstream frames comprising distribution information and overhead information, the overhead information comprising synchronization information for synchronizing the terminals to the upstream frames and authorization information for authorizing selected terminals each to transmit in an upstream frame, the terminal comprising:

a store arranged to store information allocated to the terminal, said information including an identity of the terminal and allocation information communicated to the terminal by the central station, and delay information inversely dependent upon a distance of the terminal from the central station; and a control unit arranged to store said allocation information received from the central terminal in the store, the control unit also being responsive to the authorization information in the downstream frames and the stored information allocated to the terminal for selectively communicating information from the terminal to the central station in selected upstream frames at a time dependent upon the synchronization information and the stored delay information.

16. A terminal as claimed in claim 15 wherein the authorization information in the downstream frames comprises a frame identity for each upstream frame, the store is arranged to store, as part of said allocation information, an identity of an upstream frame in which the terminal is authorized to transmit, and the control unit is arranged to compare the stored identity of an upstream frame with the frame identity in the authorization information in the downstream frames to determine upstream frames in which the terminal is authorized to transmit.

17. A method of communicating information in TDM frames in a downstream direction from a central station of a distribution network to a plurality of terminals of the network and in TDMA frames in an upstream direction from the plurality of terminal to the central station, each terminal having a respective terminal identity, comprising the steps of:

transmitting in the downstream frames distribution information and overhead information, the overhead information comprising synchronization information for synchronizing the plurality of terminals to the upstream frames and authorization information for authorizing selected terminals each to transmit in an upstream frame, the authorization information comprising a frame identity for each upstream frame; and in each terminal, storing information identifying an upstream frame and a time slot in that frame for transmission of information by the terminal, and transmitting information in a respective time slot in an upstream frame in response to the authorization information and the information stored in the terminal.

18. A method as claimed in claim 17 wherein the information stored in each terminal further comprises the respective terminal identity, and the authorization information further comprises the terminal identity of a terminal authorized to transmit in a time slot in an upstream frame and an indication identifying the time slot in the upstream frame in which said terminal is authorized to transmit.

19. A method as claimed in claim 18 wherein the indication identifying the time slot in the upstream frame in which said terminal is authorized to transmit is constituted by a relative position of the terminal identity in the downstream frame.

20. A method as claimed in claim 18 wherein the information stored in each terminal further comprises a masking field for masking part of a comparison in the terminal of its stored upstream frame identity with each frame identity in the authorization information.

21. A method as claimed in claim 17 wherein the information stored in each terminal further comprises a masking field for masking part of a comparison in the terminal of its stored upstream frame identity with each frame identity in the authorization information.

* * * * *